United States Patent [19]

Breton et al.

[11] Patent Number: 5,080,994
[45] Date of Patent: Jan. 14, 1992

[54] PROCESSES FOR THE PREPARATION OF PARTICLES

[75] Inventors: Marcel P. Breton, Mississauga; Traiko E. Petroff, Agincourt; Hadi K. Mahabadi, Mississauga, all of Canada

[73] Assignee: Xerox Corporation, Stamford, Conn.

[21] Appl. No.: 425,098

[22] Filed: Oct. 23, 1989

[51] Int. Cl.$^5$ .......................... G03G 5/00; G03G 9/00; C08K 00/00; C08F 2/00
[52] U.S. Cl. ..................................... 430/137; 430/109; 430/110; 430/111; 430/904; 522/84; 576/88
[58] Field of Search ............... 430/109, 110, 111, 137, 430/904; 522/84, 86; 526/88

[56] References Cited

U.S. PATENT DOCUMENTS

| | | | |
|---|---|---|---|
| 3,959,153 | 5/1976 | Sadamatsu et al. | 252/62.1 P |
| 4,053,316 | 10/1977 | Lu | 430/286 X |
| 4,139,437 | 2/1979 | Araki et al. | 524/458 X |
| 4,482,677 | 11/1984 | Teranaka et al. | 525/250 |
| 4,552,633 | 11/1985 | Kumakura et al. | 435/180 X |
| 4,600,676 | 7/1986 | Terada et al. | 430/110 X |
| 4,626,489 | 12/1986 | Hyosu | 430/137 |
| 4,659,641 | 4/1987 | Mahalek et al. | 430/137 |
| 4,691,045 | 9/1987 | Fukuchi et al. | 526/370 X |
| 4,804,610 | 2/1989 | Mori et al. | 430/137 |
| 4,849,318 | 7/1989 | Tsubota et al. | 430/137 |

*Primary Examiner*—Marion E. Camish
*Assistant Examiner*—Steve Crossan
*Attorney, Agent, or Firm*—E. O. Palazzo

[57] ABSTRACT

A process for the preparation of polymer particles with an average diameter of from about 0.1 to about 40 microns, which comprises (1) mixing at least one monomer with a free radical polymerization initiator, and an initiator capable of being activated with light, which monomer mixture is dispersed in an aqueous phase containing a surfactant; (2) subjecting the aforementioned mixture of (1) to light irradiation for an effective period of time to accomplish stabilization of the mixture, while initiating photopolymerization of the monomer, and (3) subsequently heating the aqueous phase thereby completing polymerization of the monomer.

33 Claims, No Drawings

PROCESSES FOR THE PREPARATION OF PARTICLES

BACKGROUND OF THE INVENTION

This invention is generally directed to processes for the preparation of particles, and more specifically to processes for the preparation of small sized polymeric particles, for example, in one embodiment with an average diameter of from about 0.1 micron to about 40 microns. More specifically, the present invention is directed to processes for the preparation of particles by photochemical suspension polymerization methods. One embodiment of the present invention relates to a process for the preparation of particles by suspension polymerization and exposure to light, such as UV light, to accomplish stabilization thereof. With the processes of the present invention, there is enabled a simple economical one step method for obtaining particles, including toners, and wherein suspension failure is avoided or minimized. Also, with the processes of the present invention in some embodiments undesirable agglomeration or coalescence is eliminated or substantially avoided, and there can be obtained particles of small average diameters, for example, of from 0.1 to about 40 microns. As indicated herein, the particles obtained with the process of the present invention can, for example, be selected as toner polymer resins for toner and developer compositions, and these particles may also be selected as resin binders for liquid toners. As compared to known processes such as suspension polymerization and semisuspension polymerization, the processes of the present invention hves the advantages of permitting the formation of particles in a one step process. In semisuspension polymerization processes at least two process steps are needed. Furthermore, about 0.1 to about 40 microns average diameter particles cannot, it is believed, be effectively prepared by conventional suspension polymerization processes. Another advantage of the processes of the present invention resides in accomplishing the photostabilization both in a batch process and an economical continuous process.

Conventionally, the formation of small polymeric particles for use in dry toners, liquid toners and developers, nonimaging applications such as chromatographic supports and medical applications has been generally accomplished by emulsion polymerization, dispersion polymerization, suspension polymerization and semisuspension polymerization processes. Emulsion polymerization can be selected to prepare submicron particles and can yield larger particles only upon being submitted to a swelling process or multi-step swelling processes. Emulsion polymerizations are initiated with water soluble initiators and the solubility of the starting monomer in the water phase is an important factor since it influences the process kinetics. Also of interest is U.S. Pat. No. 4,486,559, which discloses the incorporation of a prepolymer into a monomer toner mix followed by emulsion polymerization; and U.S. Pat.' Nos. 4,680,200 and 4,702,988, which illustrate emulsion polymerization.

Dispersion polymerizations are usually performed in an organic medium wherein all the monomers are soluble in the medium prior to the polymerization and insoluble after the polymerization. Solvent recovery in this process is very costly. Moreover, dispersion polymerization is rarely accomplished in a water medium. In dispersion polymerization, the stabilizer permits the formation of a protective layer on the surface of each particle thereby improving stability, however, this process does not, for example, usually effectively permit the incorporation of solid additives within the particles.

Suspension polymerization of monomer for the formation of polymer particles generally in a size range of about 200 microns and higher is known. The main advantage of suspension polymerization is that the product may easily be recovered, therefore, such a process is considered economical. However, it is very difficult by suspension polymerization to prepare very small particles as the monomer droplets tend to coalesce during the polymerization process, especially in the initial stage of polymerization where the droplets are very sticky. For example, there is disclosed in U.S. Pat. No. 3,243,419 a method of suspension polymerization wherein a suspending agent is generated during the suspension polymerization to aid in the coalescence of the particles. Also disclosed in U.S. Pat. No. 4,071,670 is a method of suspension polymerization wherein the monomer initiator mixture is dispersed in water containing stabilizer by a high shear homogenizer, followed by polymerization of suspended monomer droplets. Since the particles formed by suspension polymerization are generally larger than 50 microns and as large as about 200 microns in size, they are not as desirable as carrier powder coatings or as toner polymer resins.

There was recited in a patentability search report the following prior art, all U.S. Pat. Nos. 4,804,610 relating to processes for the preparation of toner by a suspension method with a variety of monomers, such as styrene, acrylic acid ester, or methacrylic acid ester, and polymerization initiator azo compounds; 4,626,489, a continuation-in-part of 4,601,968, relating to processes for the preparation of toners by suspension polymerization of a monomer, a polymerization initiator, and a colorant; and 4,659,641 which discloses a suspension polymerization method for the preparation of toners, and wherein surfactants such as sodium alkylnaphthalene sulfonate are selected.

Illustrated in copending applications U.S. Ser. No. 339,539/89, and U.S. Pat. No. 3,043,404, the disclosures of which are totally incorporated herein by reference, are semisuspension polymerizations for the preparation of particles, including submicron particles, and toners thereof. More specifically, there is illustrated in this copending application and patent (1) a process for the preparation of toner particles which comprises mixing at least one resin monomer with a polymerization initiator, a crosslinking component and a chain transfer component; effecting bulk polymerization until partial polymerization has been accomplished; mixing with the aforementioned partially polymerized monomer product pigment or dye particles, thereby forming an organic phase; dispersing the organic phase in water containing a stabilizing component whereby there is obtained a suspension of toner particles in water; and polymerizing the toner suspension; (2) a process for the preparation of toner particles which comprises mixing at least one resin monomer with a polymerization initiator, a crosslinking component and a chain transfer component; effecting bulk polymerization until from about 10 to about 50 weight percent of the monomer has polymerized; mixing with the aforementioned partially polymerized monomer product pigment or dye particles until an organic phase is formed; dispersing the organic phase in water containing a stabilizing component whereby there is obtained a suspension of toner particles in water; and polymerizing the toner suspension; and (3) a process for the preparation of polymeric particles which comprises mixing at least one monomer with a polymerization initiator, a crosslinking component and a chain transfer component; effecting bulk polymerization until from about 10 to about 50 weight percent of the monomer has been polymerized; dispersing the aforementioned partially polymerized product in water containing a stabilizing component to obtain a suspension of particles with an average diameter of from about 0.1 to about 5 microns in water; and polymerizing the resulting suspension. Semisuspension polymerization processes, such as those described in the aforementioned copending applications, are considered multistep particle formation processes suitable for the preparation of particles with an average diameter of from, for example, about 0.1 to about 25 microns which preferably can be selected as powder coatings, toners and toner additives.

Other methods selected for the formation of small polymeric particles are also known wherein grinding or attrition, especially fluid energy milling, of large particles to the size desired for powder coating, that is for example from about 0.1 to about 5 microns, is often not desirable from, for example, an economic and functional viewpoint. Powder coatings with submicron particles are desirable as it allows complete coating of the carrier core, such as carrier beads, with a thinner film. Also, particles with average particle diameters of less than 40 microns are very difficult to obtain by grinding or attrition. Further, processes such as spray drying of polymers suspended in solvent can result in polymer particles with a wide size range as well as trapping of the solvent selected which interferes with the use of the particles obtained as for coatings. Moreover, solvent recovery processes can be costly.

There is disclosed in U.S. Pat. No. 3,505,434 a process wherein particles which can be used, for example, for fluidized bed powder coating are prepared by dispersing nonspherical polymer particles in a liquid which is heated to above the polymer melting point and stirred causing the polymer particles to become substantially spherical. The particles are then cooled below their melting point and recovered. However, this process does not, for example, readily enable particles with an average particle diameter size of below 50 microns since the original particles must be prepared by conventional grinding or attrition processes. This process is also limited by utilization of particles wherein the melting point of the particles is lower than the boiling point of the medium.

There is disclosed in U.S. Pat. No. 4,602,970 and European Patent 183890-B a process by which photochemical energy in combination with thermally initiated polymerization is selected to stabilize emulsions. The stabilization is accomplished, for example, by a surfactant, such as sorbitan monoleate, which contains a polymerizable double bond. With the process of the present invention, polymeric or low molecular weight surfactants containing reactive double bonds selected to stabilize the submicron suspensions can be avoided if desired. Although it is not desired to be limited by theory, stabilization for the processes of the present invention is, it is believed, the result of the photochemical grafting of surfactants with oil soluble monomers to form a protective layer at the surface of the nonpolymerized particles. These particles can then be polymerized thermally without agglomeration problems or coalescence. Also disclosed in U.S. Pat. No. 4,248,685 are polymerization processes involving both photochemical and thermal free radical initiation to form submicron emulsions, and wherein the initiators selected are dispersed in the water phase and not in the monomer phase. There is thus a need for polymerization processes which will allow the formation of from about 0.1 to about 40 average diameter micron particles in a water medium wherein polymerization initiators are not present in the water medium and are present and soluble in the monomeric medium.

There have been proposed processes for obtaining toner compositions with certain particle size distributions in a reactor. These processes include dispersion polymerization, suspension polymerization and emulsion polymerization as illustrated herein, and the like. Disclosed in U.S. Pat. No. 4,486,559, the disclosure of which is totally incorporated herein by reference, is the preparation of a toner composition by the incorporation of a prepolymer into a monomer/pigment mixture, followed by emulsion polymerization, see for example columns 4, 5 and 8 of this patent. Also, methods of preparing toner, including suspension/dispersion polymerization, are detailed in columns 1 and 2 of this patent. In these processes, the pigment and additives, such as charge control components, are added to a monomer or comonomers prior to polymerization. Particle formation is achieved by the dispersion of the pigmented monomer or comonomers in a continuous phase such as water, and the droplets of pigmented monomers are then polymerized to form toner particles. One advantage of these processes is the elimination of fusion mixing (Banbury/extruder) and pulverization classification processing. Nevertheless, it is usually difficult with these processes to accomplish polymerization of pigmented monomer droplets in an average size diameter of from about 5 to about 25 microns with a narrow particle diameter distribution of, for example, 1.3. Also, suspension failure is common with these processes especially when the monomer droplet diameter is less than 50 microns and as polymerization proceeds in the sticky region, which generally occurs at monomer conversions of from 10 to 50 percent. Moreover, the prior art grinding processes for the preparation of particles is usually not as economical as desired. Jetting or other mechanical grinding processes are costly since they are energy extensive processes and also, they produce materials with a wide particle size distribution which need classification, therefore resulting in losses of materials and lower yields. These, and other disadvantages may be avoided or minimized when the processes of the present invention are selected for the preparation of particles and toner compositions.

There thus remains a need for a simple, direct, economical process of obtaining small polymeric particles, and more specifically toner polymeric particles with an average size diameter of from about 0.1 to about 40 microns. Further, there is a need for suspension polymerization processes for obtaining small dry toner polymeric particles of, for example, from about 0.1 to about 40 microns in average size diameter as determined by a scanning electron microscope. Additionally, there is a need for improved suspension polymerization processes that permit dry polymeric particles that can be selected as toners, as carrier powder coatings, and as toner additives for photoreceptor cleaning. There is also a need for a process which allows in situ stabilization of submicron monomeric particles dispersed in a water medium thus minimizing the amount of stabilizer or surfactant needed for stabilizing the particles prior to further treatment such as heating and polymerization. Also, there is a need for a direct process for the preparation of toner polymer particles with an average diameter of from about 0.1 to about 40 microns by a polymerization mechanism in which the initiators are only present in the monomer phase.

SUMMARY OF THE INVENTION

It is, therefore, an object of this invention to provide processes for polymeric particle formation with many of the advantages illustrated herein:

In another object of the present invention there are provided simple processes for the formation of polymeric particles, and more specifically toner polymeric particles.

Yet, in another object of the present invention there are provided simple and economical processes for the formation of polymeric particles, and more specifically toner size polymeric particles.

Another object of the present invention resides in the provision of simple and economical direct processes for the preparation of dry polymeric particles, especially polymeric particles for toners.

Additionally, another object of the present invention resides in the provision of simple and economical processes for the preparation of polymeric particles, especially polymeric particles for liquid toners.

Moreover, another object of the present invention resides in simple and economical one-step suspension polymerization processes for the preparation of small dry polymeric particles.

In another object of the present invention there are provided as a result of the enhanced degree of control and flexibility processes for the preparation of polymeric particles, wherein undesirable coalescence and or agglomeration thereof are avoided or minimized, and wherein particles with an average particle diameter of from about 0.1 to about 40 microns can be obtained in one step.

These and other objects of the present invention are accomplished by the provision of processes for the preparation of polymer particles. More specifically, the present invention is directed to the preparation of particles with an average diameter size of from about 0.1 to about 40 microns by suspension polymerization and light stabilization, which particles can be obtained at room temperature and without the need for a separate encapsulation step.

There is provided with the present invention a process for the preparation of polymer particles with an average diameter particle size of from about 0.1 to about 40 microns, which comprises (1) mixing at least one monomer with a free radical polymerization initiator, and an initiator capable of being activated with light, which monomer mixture is dispersed in an aqueous phase containing a surfactant; (2) subjecting the aforementioned mixture of (1) to light irradiation for an effective period of time to accomplish stabilization of the mixture, while initiating photopolymerization of the core monomer; and (3) subsequently heating the aqueous phase thereby completing polymerization of the core monomer.

One embodiment of the present invention comprises the preparation of polymer particles by providing a monomer or monomers, a free radical initiator, an ultraviolet light sensitizer and/or photoinitiator, which components are dispersed in an aqueous phase containing a surfactant, especially a surfactant without active double bonds and wherein a dispersion can be preferably formed by a homogenizer or fluidizer; irradiating the resulting susupension with, for example, a medium pressure mercury lamp for an effective period of time to permit stabilization of the suspension during which time the photoinitiator initiates polymerization of the monomer or monomers, and the temperature slowly increases to from about 25° to about 60° C. because of the heat generated by the medium pressure mercury lamp (an optional cooling system could be used to control the temperature of the suspension) heating the suspension to complete polymerization of the monomer or monomers at a temperature of, for example, from about 50° to about 100° C.; and thereafter optionally washing the polymer particles. There results polymer particles with an average diameter of from about 0.1 to about 40 microns.

In a specific embodiment of the present invention polymer particles are prepared by (1) mixing, for example, in a suitable container, a monomer or mixtures of monomers, for example, from 2 to about 100 microns, which monomer components may contain a crosslinking monomer such as trimethylolpropane triacrylate for the purpose of controlling the melt viscosity of the particles in an amount of up to 40 percent by weight of the monomer or monomer mixture and preferably from about 0.01 percent to about 40 percent by weight, and a photoinitiator in an amount of from about 0.01 percent to 2.0 percent and preferably from about 0.1 percent to about 1.5 percent by weight of the monomer(s); (2) dispersing the aforementioned monomer(s) initiator mixture in from about 3 to about 8 times its volume of water containing from about 0.001 percent to about 5 percent by weight and preferably from about 0.005 to about 4 percent by weight of a stabilizing component or components to form a suspension with a particle size diameter of from about 0.1 micron to about 40 microns with, for example, a high shear mixer such as a Brinkmann PT45/80 homogenizer; (3) transferring the resulting suspension to a reactor equipped with a stirring system; (4) irradiating the suspension for an effective period of time of, for example, from about 1 minute to about 7 hours, and preferably from about 30 minutes to about 6 hours, to effect stabilization of the suspension; (5) adding a free radical thermal initiator to the resulting mixture in an amount of from about 0.01 to about 4 percent by weight and preferably from about 0.1 to about 2 percent by weight of the monomer(s); and (6) completing the polymerization of the stabilized suspension by heating to a temperature of from about 45° to about 100° C., and preferably from about 60° to about 100° C., preferably for a period of from about 3 to about 6 hours.

In another specific embodiment of the present invention toner polymer particles are prepared by (1) mixing a monomer or monomer mixtures, which may contain a crosslinking monomer thereby enabling control of the rheological properties of the particles, such as their melt viscosity, in an amount of up to 40 percent by weight of monomer or monomer(s), and preferably from about 0.01 percent to about 40 percent by weight with a photoinitiator in an amount of from about 0.01 percent to 2.0 percent, and preferably from about 0.1 percent to about 1.5 percent by weight of monomer or monomer(s) and a free radical thermal initiator in an amount of from about 0.01 to about 4 percent by weight, and preferably from about 0.1 to about 2 percent by weight of the monomer or monomer(s); (2) dispersing the monomer or monomer(s) mixture in from about 3 to about 8 times its volume of water containing from about 0.001 percent to about 5 percent by weight, and preferably from about 0.005 to about 4 percent by weight of a stabilizing component or components to form a suspension with a particle size diameter of from about 0.1 micron to about 40 microns with, for example, a high shear mixer such as a Brinkmann PT45/80 homogenizer; (3) transferring the resulting suspension to a reactor equipped with a stirring system; (4) irradiating the suspension for an effective period of time of, for example, from about 1 minute to about 7 hours, and preferably from about 30 minutes to about 6 hours to enable stabilization of the suspension; (5) completing the polymerization of the stabilized suspension by heating, for example, to a temperature of from about 45° to about 120° C. and preferably from about 60° to about 100° C. for a period of from about 3 to about 6 hours, separating the polymer product, and admixing pigment, dyes or mixtures thereof with said product.

Another specific embodiment of the present invention is directed to the preparation of polymer particles by (1) mixing a monomer or comonomers which may contain a crosslinking monomer in an amount of up to 40 percent by weight of monomer, and preferably from about 0.01 percent to about 40 percent by weight with a photoinitiator/sensitizer system with the photoinitiator and the sensitizer being present in an amount of from about 0.01 percent to 2.0 percent, and preferably from about 0.1 percent to about 1.5 percent by weight of monomer or comonomers, respectively, and a free radical thermal initiator in an amount of from about 0.01 to about 4 percent by weight, and preferably from about 0.1 to about 2 percent by weight of the monomer or comonomers; (2) dispersing the monomer or comonomers mixture in from about 3 to about 8 times its volume of water containing from about 0.001 percent to about 5 percent by weight, and preferably from about 0.005 to about 4 percent by weight of a stabilizing component or components to form a suspension with a particle size diameter of from about 0.1 micron to about 40 microns using a high shear mixer such as a Brinkmann PT45/80 homogenizer; (3) transferring the resulting suspension to a reactor equipped with a stirring system; (4) irradiating the suspension for an effective period of time to enable stabilization of the suspension; and (5) completing the polymerization of the stabilized suspension by heating to, for example, a temperature of from about 45° to about 120° C., and preferably from about 60° to about 100° C. for a period of from about 3 to about 6 hours.

Moreover, in another specific embodiment of the present invention polymer particles are prepared by (1) mixing a monomer or comonomers which may contain a crosslinking monomer in an amount of up to 40 percent by weight of monomer, and preferably from about 0.01 percent to about 40 percent by weight with a photoinitiator/sensitizer system with the photoinitiator and the sensitizer being present in an amount of from about 0.01 percent to 2.0 percent, and preferably from about 0.1 percent to about 1.5 percent by weight of monomer(s), respectively, and a free radical thermal initiator in an amount of from about 0.01 to about 4 percent by weight, and preferably from about 0.1 to about 2 percent by weight of the monomer or comonomers; (2) dispersing the monomer or comonomers mixture in from about 3 to about 8 times its volume of water containing from about 0.001 percent to about 5 percent by weight and preferably from about 0.005 to about 4 percent by weight of a stabilizing surfactant component or components to form a suspension with a particle size diameter of from about 0.1 micron to about 40 microns with a microfluidizer (available from Microfluidics); (3) transferring the resulting suspension to a reactor equipped with a stirring system; (4) irradiating the suspension for an effective period of time to permit stabilization of the suspension; (5) completing the polymerization of the stabilized suspension by heating to a temperature of from about 45° to about 120° C., and preferably from about 60° to about 100° C. for a period of from about 3 to about 6 hours; (6) washing the product three times each with methanol and water by means of filtration or centrifugation; and (7) thereafter drying the resulting polymeric particles.

With further respect to the processes of the present invention, the monomer or comonomers mixture may contain as additives an inert filler resin in, for example, an amount of up to 10 percent by weight thereby permitting modification of the initial viscosity of the monomer or monomers mixture and thus affect the particle size and rheological properties of the particles prior to and subsequent to polymerization; a chain transfer agent with functions primarily to control the weight average molecular weight, that is from about 5,000 to about 2,000,000 and preferably from about 5,000 to about 500,000 by inhibiting chain growth, which agent is selected, for example, in an amount of from 0.01 to about 1 weight percent of monomer or monomer mixture; and a dye, and/or pigment or pigments in an amount of, for example, up to 20 percent by weight of the resulting particles. The aforementioned additives are present in amounts that allow the stabilization step to be effective. Known processes for coloring polymeric particles such as swelling processes can be selected to obtain colored toners (cyan, magenta, yellow, red, green, blue, brown) from the colorless particles obtained with the processes of the present invention in some embodiments.

Illustrative examples of monomer or monomers present in an effective amount of, for example, from about 70, and preferably 80, to about 99 weight percent include vinyl monomers such as styrene and its derivatives such as styrene, α-methylstyrene, p-chlorostyrene and the like; butadiene in combination with styrene; monocarboxylic acids and their derivatives such as acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; dicarboxylic acids having a double bond and their derivatives such as maleic acid, monobutyl maleate, dibutylmaleate; vinyl esters such as vinyl chloride, vinyl acetate and vinyl benzoate; vinyl ketones such as vinyl methyl ketone and vinyl ether ketone; and vinyl ethyl ether and vinyl isobutyl ether; vinyl naphthalene; unsaturated mono-olefins such as isobutylene and the like; vinylidene halides such as vinylidene chloride and the like; N-vinyl compounds such as N-vinyl pyrrole and the like; and mixtures thereof.

Illustrative examples of polyfunctional or crosslinker monomers which that can be selected for the process of the present invention in an amount of up to 40, and preferably from about 0.1 to about 40 percent, by weight of the monomer or monomer mixture used include 1,4 butanediol diacrylate, trimethylolpropane triacrylate, pentaerythritol derivatives, triethylene glycol diacrylate, triethylene glycol dimethacrylate, and the like. A typical example of an irradiation lamp which can preferably be used effectively in the processes of the present invention include a medium pressure mercury lamp that is a lamp having a maximum output at 365 nanometers and a high ultraviolet energy output per unit length.

Illustrative examples of photoinitiators present preferably in an amount of from about 0.01 percent to 2.0 percent, and preferably from about 0.1 percent to about 1.5 percent by weight of the monomer or monomer mixtures that can be selected for the processes of the present invention include those, for example, which are used as photoresist materials and in photopolymerizable printing inks, reference U.S. Pat. No. 4,795,766 or EP 108037-A, the disclosures of which are totally incorporated herein by reference. Propiophenone photoinitiator derivatives when selected for the processes of the present invention enable the formation of dry or liquid toners, and colored particles. Typical initiators include those of the formula $R_3CO-C(OR_1)R_4-C(OR_2)R_5R_6$ wherein $R_1$ is hydrogen, alkyl preferably with from 1 to about 6 carbon atoms such as methyl, ethyl, propyl, butyl and the like, allyl, benzyl, $Si(CH_3)_3$, and the like; $R_2$ is independently hydrogen, alkyl preferably with from 1 to about 6 carbon atoms, alkoxy preferably with from 1 to about 12 carbon atoms, substituted alkyl preferably hydroxyl substituted alkyl, and the like; $(CH_2CH_2O)_n-R_5$ wherein n is a number of from 2 to about 20; and $R_5$ is hydrogen, alkyl preferably with from 1 to about 6 carbon atoms, benzyl, alkynyl preferably with from 3 to about 6 carbon atoms, $Si(CH_3)_3$, alkynyl preferably with from 3 to about 6 carbon atoms, 2-tetrahydropyranyl, 2-tetrahydrofuranyl, and the like, including hydroxyalkyl, aryl, preferably phenyl substituted alkylidene, linear or branched alkadiyl-, benzylidene, cyclopentylidene, cyclohexylidene, 2,2,2-trichloroethylidene, 2-furyl-methylidene or dimethylsilylidene groups, $R_3$ can be a mono- or poly-substituted component, wherein the substituent is preferably halogen such as chlorine, alkyl, alkoxy, alkyl thio, benzoyl phenyl, phenoxy phenyl-thiophenyl, and the like; $R_4$ can be alkyl, phenyl, substituted phenyl preferably with halogen such as chlorine, alkyl, alkoxy, and the like; $R_5$ can be hydrogen, alkyl, or substituted alkyl, and the like; $R_4$ and $R_5$ together can be linked to form $(CH_2)_3$ and $(CH_2)_4$, and the like; and $R_6$ can be hydrogen, alkyl, substituted alkyl, phenyl, substituted phenyl, and the like. Also, there may be selected as photoinitiators the components as disclosed in U.S. Pat. No. 4,755,541 or EP Publication 209831, the disclosures of which are totally incorporated herein by reference. Examples of such initiators include mixtures of benzophenone derivatives with organic tertiary aliphatic amines; estes of p-dimethylaminobenzoic acid; 4,4'-bis(dialkylamino) benzophenone; polymeric ethers of primary or secondary alcohols, glycols; primary or secondary aliphatic alcohols; and the like. Preferred visible light photoinitiators include ionic dye-counter ion compounds specific examples of which include cationic dyes such as methylene blue, safranine O, malachite green, cyanine dyes and rhodamine dyes, and the like. Preferred counterions for the cationic dye are triphenylbutylborate and trianisylbutylborate anions since they readily dissociate to triphenylborane or trianisylborane and a butyl radical.

Chain transfer components that can be selected and which primarily function to control the molecular weight, for example from about 5,000 to about 2,000,000, and preferably from about 5,000 to about 500,000 weight average molecular weight of the polymer product, by inhibiting chain growth include mercaptans such as laurylmercaptan, butylmercaptan and the like, or halogenated carbons such as carbon tetrachloride or carbon tetrabromide and the like. The chain transfer agent is preferably present in an amount of from about 0.01 to about 1 weight percent of monomer or comonomer mixture.

Also, for the primary purpose of further controlling the particle size prepared by the process of the present invention, it is preferred to select a surfactant or mixture thereof. Examples of surfactants present in an effective amount of, for example, from about 0.001 to about 3 percent by weight of the aqueous phase, and preferably from about 0.005 to about 2 percent by weight include both ionic and nonionic surfactants, such as poly(acrylic acid) in combination with Alkanol XC, hydroxypropylcellulose, and polyvinylalcohol and its derivatives. Other surfactants can also be used for the process of this invention such as polyethylene sulfonic acid salt, carboxylated polyvinylalcohol, water soluble block copolymers such as Pluronics and Tetronics commercially available from BASF, cellulose derivatives such as hydroxypropyl cellulose, hydroxyethyl cellulose, and the like. Lignosulfonate and polyelectrolyte dispersants can also be selected, including those available from W. R. Grace as Daxad.

Further, surfactants present on the surface of the polymeric particles can be washed primarily to effect the removal thereof using an alcohol such as, for example, methanol and the like, or water. Separation of washed particles from solution can be achieved by various known separation techniques such as filtration, centrifugation and the like. Drying methods such as vacuum drying, freeze drying, spray drying, fluid bed drying and the like can be selected for drying of the polymeric particles.

Numerous well known suitable pigments can be selected as the colorant for the toner particles containing the polymers obtained with the processes of the present invention including, for example, carbon black, nigrosine dye, aniline blue, phthalocyanine derivatives, such as heliogen blue available from BASF, magnetites, and mixtures therof. The pigment is generally present in a sufficient amount to render the toner composition colored thereby permitting the formation of a clearly visible image. Generally, the pigment particles are present in amounts of from about 1 percent by weight to about 20 percent by weight, and preferably in an amount of from about 2 to about 10 weight percent based on the total weight of the toner composition, however, lesser or greater amounts of pigment particles may be selected.

Embraced within the scope of the present invention are colored toner compositions containing as pigments or colorants red, green, blue, brown, magenta, cyan, and/or yellow particles, or mixtures thereof. More specifically, with regard to the generation of color images utilizing the toner and developer compositions of the present invention, illustrative examples of magenta materials that may be selected include, for example, 2,9-dimethyl-substituted quinacridone and anthraquinone dye identified in the Color Index as CI 60710, CI Dispersed Red 15, a diazo dye identified in the Color Index as CI 26050, CI Solvent Red 10, Lithol Scarlett, Hostaperm, and the like. Illustrative examples of cyan materials that may be selected as pigments include copper tetra-4-(octadecyl sulfonamido) phthalocyanine, X-copper phthalocyanine pigment listed in the Color Index as CI 74160, CI Pigment Blue, and Anthrathrene Blue identified in the Color Index as CI 69810, Special Blue X-2137, Sudan Blue, and the like; while illustrative examples of yellow pigments that may be selected include diarylide yellow 3,3-dichlorobenzidene acetoacetanilides, a monazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. These pigments are generally present in the toner composition in an amount of from about 1 weight percent to about 15 weight percent based on the weight of the toner resin particles.

The particles of the present invention can also be selected as carrier coatings, which carriers contain, for example, a steel or ferrite core, and can be admixed with toner compositions comprised of resin particles, pigment particles and optional additives such as charge contol components, reference U.S. Pat. No. 4,560,635, the disclosure of which is totally incorporated herein by reference, enabling the formation of a developer composition useful in electrophotographic imaging processes.

With further respect to the present invention, in another embodiment the polymer particles obtained by the process of the present invention can be admixed with pigment particles as illustrated herein and formulated into toner compositions by known means, including melt mixing, extrusion processing, and the like, reference for example U.S. Pat. No. 4,560,635, the disclosure of which has been totally incorporated herein by reference. The toner compositions may contain additives therein or thereon, such as charge enhancing additive components, which assist in rendering the toner resin particles either positively or negatively charged, colloidal silicas, metal salts of fatty acids, metal salts, and the like. Generally, the charge enhancing additives are present in an amount of from about 0.1 to about 10 weight percent, and the other additives are preferably present as surface additives on the toner particles in an amount of from about 0.1 to about 3 weight percent, and preferably from 0.1 to 1 weight percent. Developer compositions can be formulated by admixing the aforementioned toner compositions with the carrier components including carriers comprised of cores of steel, ferrites, iron, and the like, which cores can contain thereover polymeric coatings including fluorocarbon polymers, styrene methacrylate, organosiloxane terpolymers, two polymer coatings, reference for example U.S. Pat. No. 4,935,326 and U.S. Pat. No. 4,935,326, entitled Developer Compositions For Coated Carrier Particles, the disclosures of which are totally incorporated herein by reference, and the like.

The following examples are being submitted to further define various species of the present invention. These examples are intended to be illustrative only and are not intended to limit the scope of the present invention. Also, parts and percentages are by weight unless otherwise indicated. The particle sizes obtained are expressed in average diameter. Avoidance of suspension failure was determined by the absence of large aggregates as established visually, or by optical microscopy. Moreover, with respect to many of the examples, the process parameters, amounts of components and the like were substantially similar. A control experiment was performed (Example XII) without an irradiation step. Suspension failure occured and no particles were obtained.

EXAMPLE I

Polymer particles were prepared as follows: a photoinitiatorsensitizer system composed of benzophenone (0.42 gram, available from Fisher Scientific), 4,4' bisdimethylaminobenzophenone (Michler's ketone) (0.5 gram, available from Polysciences, Inc.) and the free radical polymerization initiator, 2.0 grams of Lauroyl peroxide, available from Aldrich Chemical, were dissolved in a monomer mixture containing methyl methacrylate (20.0 grams, available from Polysciences) and styrene (160.0 grams, available from Aldrich). The resulting mixture was dispersed in 800 grams of a 1.0 percent polyvinylalcohol (PVOH) (available from Aldrich, molecular weight 3,000 (K), 75 percent hydrolized) solution using a Microfluidizer M-110 equipped with static polyethylene seals (available from Microfluidics Corporation) at a dynamic pressure of 45 psi and a flow of 333.3 milliliters per minute. After at least two continuous passes through the microfluidizer interacting chamber (7 minutes), the solution was collected and transferred to a 2 liter glass reactor and retained under constant agitation with a magnetic stirring bar. The solution was then irradiated under nitrogen with a 550 W Hanovia medium pressure mercury lamp for a period of 2¼ hours. The lamp was suspended about 2 inches above the top of the reactor. During this time, the temperature of the suspension of fine particles slowly climbed to about 53° C. Subsequent to irradiation, the reactor was heated to 85° C. for a period of 3 hours. There resulted very smooth spherical particles with particles as large as 2.5 microns as measured by optical microscopy. The overall average particle size diameter was measured at 0.3 micron with a Brookhaven BI-90 particle sizer. There was no indication of suspension failure since the particle size distribution as determined by visual observation with optical microscopy before the heating step was similar to the distribution after heating. The particles were then washed three times with methanol, followed by 3 more times with diionized water and finally dried in a freeze dryer to provide a free flowing powder. The weight average molecular weight of the tetrahydrofuran extractable fraction of the above particles, which was measured by size exclusion chromatography, was about $1.20 \times 10^5$ grams/mole.

EXAMPLE II

Fine polymer particles were prepared as follows: a photoinitiator, 4,4' bisdimethylaminobenzophenone (Michler's ketone) (1 gram, Polysciences), was dissolved in a monomer mixture containing 1,1,1 trimethylolpropanetriacrylate (30 grams, Polysciences) and styrene (60 grams, Aldrich). The resulting mixture was dispersed in 400 grams of a 2 percent poly(acrylic acid) (PAA) (Aldrich, molecular weight 250,000) solution containing Alkanol XC (DuPont), a sodium alkylnaphthalene sulfonate, in a ratio of 1 to 10 with respect to the amount of PAA, that is 0.2 percent, using a Brinkmann PT45/80 homogenizer and a PTA 35/4G probe for 2 minutes at 10,000 rpm in a 1,000 milliliter beaker (cooled with ice). The resulting solution was then transferred to a 2 liter glass reactor and retained under constant agitation with a magnetic stirring bar. Subsequently, the aforementioned solution was irradiated under nitrogen with a 550 W Hanovia medium pressure mercury lamp for a period of 6 hours. The lamp was suspended about 2 inches above the top of the reactor. During this time, the temperature of the suspension of fine particles slowly increased to about 45° C. Subsequent to irradiation, a free radical polymerization initiator (1 gram of Vazo-52 available from Polysciences) was added to the suspension and the reactor was heated to 60° C. for a period of 4 hours. There resulted very smooth spherical particles with an average particle diameter of from about 0.2 to about 1.5 microns as measured by a scanning electron microscopy without any indications of suspension failure. The particles were then washed and dried as described in Example I.

EXAMPLE III

Fine toner polymer particles were prepared as follows: a photoinitiator, 4,4' bisdimethylaminobenzophenone (Michler's ketone) (1 gram, Polysciences), and a free radical polymerization initiator (1 gram of Vazo-52 from Polysciences) were dissolved in a monomer mixture containing 1,1,1 trimethylolpropanetriacrylate (30 grams, Polysciences) and styrene (60 grams, Aldrich). The resulting mixture was dispersed in 400 grams of a 2 percent hydroxypropyl cellulose (HPC) (Scientific Polymer Products, MW=60,000 weight average) solution containing 0.1N (normal) sodium hydroxide using a Brinkmann PT45/80 homogenizer and a PTA 35/4G probe for 2 minutes at 10,000 rpm in a 1,000 milliliter beaker (cooled with ice). The solution was transferred to a 2 liter glass reactor and retained under constant agitation with a magnetic stirring bar. Thereafter, the aforementioned mixture was irradiated under nitrogen with a 550 W Hanovia medium pressure mercury lamp for a period of 4 hours. The lamp was suspended about 2 inches above the top of the reactor. During this time, the temperature of the suspension of fine particles slowly increased to about 45° C. Subsequent to irradiation, the reactor was heated to 60° C. for a period of 4 hours. There resulted very smooth spherical particles with an average particle size diameter of about 1.2 microns as measured with a BI-90 Brookhaven Instrument without any indications of suspension failure. Particles as large as 2 microns were detected by optical microscopy. The particles were then washed and dried as described in Example I.

EXAMPLE IV

Fine toner polymer particles were prepared as follows: a photoinitiator-sensitizer system composed of benzophenone (0.164 gram, Fisher) and 4,4' bisdimethylaminobenzophenone (Michler's ketone) (0.245 gram, Polysciences), respectively, and a free radical polymerization initiator (1 gram of Vazo-52 from Polysciences) were dissolved in a monomer mixture containing 1,1,1 trimethylolpropanetriacrylate (30 grams, Polysciences) and styrene (60 grams, Aldrich). The resulting mixture was dispersed in 400 grams of a 4 percent hydroxypropyl cellulose (HPC) (Scientific Polymer Products, MW=60,000 weight average) solution containing 0.1 normal sodium hydroxide using a Brinkmann PT45/80 homogenizer and a PTA 35/4G probe for 2 minutes at 10,000 rpm in a 1,000 milliliter beaker (cooled with ice). The solution was transferred to a 2 liter glass reactor and retained under constant agitation with a magnetic stirring bar. Thereafter, the aforementioned solution was irradiated under nitrogen with a 550 W Hanovia medium pressure mercury lamp for a period of 4 hours. The lamp was suspended about 2 inches above the top of the reactor. During this time, the temperature of the suspension of fine particles slowly increased to about 45° C. Subsequent to irradiation, the reactor was heated to 60° C. for a period of 4 hours. There resulted very smooth spherical particles with an average diameter particle size of about 0.9 micron as measured with a BI-90 Brookhaven Instrument without any indications of suspension failure. The particles may be washed and dried as described in Example I.

EXAMPLE V

Fine toner resin particles were prepared as follows: a photoinitiator-sensitizer system composed of benzophenone (0.164 gram, Fisher) and 4,4' bisdimethylaminobenzophenone (Michler's ketone) (0.245 gram, Polysciences) and a free radical polymerization initiator (1 gram of Lauroyl peroxide, Aldrich) were dissolved in a monomer mixture containing 1,1,1 trimethylolpropanetriacrylate (30 grams, Polysciences) and styrene (60 grams, Aldrich). The resulting mixture was dispersed in 400 grams of a 0.5 percent poly(acrylic acid) (PAA) (Aldrich, weight average molecular weight 250,000) solution containing Alkanol XC (DuPont), a sodium alkylnaphthalene sulfonate, in a ratio 1 to 10 with respect to the amount of PAA, that is 0.05 percent, using a Brinkmann PT45/80 homogenizer and a PTA 35/4G probe for 2 minutes at setting 10 in a 1,000 milliliter beaker (cooled with ice). The solution was transferred to a 2 liter glass reactor and retained under constant agitation with a magnetic stirring bar. Subsequently, the solution obtained was irradiated under nitrogen with a 550 W Hanovia medium pressure mercury lamp for a period of 2½ hours. The lamp was suspended about 2 inches above the top of the reactor. During this time, the temperature of the suspension of fine particles slowly increased to about 45° C. Subsequent to irradiation, the reactor was heated to 70° C. for a period of 4½ hours. There resulted very smooth spherical particles with an average particle size diameter of about 1.2 microns as measured with a BI-90 Brookhaven Instrument without any indications of suspension failure. The size of the particles was also confirmed by optical microscopy. The particles were washed and dried as described in Example I.

EXAMPLE VI

Fine toner resin particles were prepared as follows: a photoinitiator-sensitizer system composed of benzophenone (0.164 gram, Fisher) and 4,4' bisdimethylaminobenzophenone (Michler's Ketone) (0.245 gram, Polysciences) and a free radical polymerization initiator (1 gram of Lauroyl peroxide, Aldrich) were dissolved in a monomer mixture containing 1,1,1 trimethylolpropanetriacrylate (30 grams, Polysciences) and styrene (60 grams, Aldrich). The resulting mixture was dispersed in 400 grams of a 0.05 percent poly(acrylic acid) (PAA) (Aldrich, molecular weight 250,000) solution containing Alkanol XC (DuPont), a sodium alkylnaphthalene sulfonate, in a ratio 1 to 10 with respect to the amount of PAA, that is 0.005 percent, using a Brinkmann PT45/80 homogenizer and a PTA 35/4G probe for 2 minutes at setting 10 in a 1,000 milliliter beaker (cooled with ice). The solution was transferred to a 2 liter glass reactor and kept under constant agitation with a magnetic stirring bar. Thereafter, the resulting solution was irradiated under nitrogen with a 550W Hanovia medium pressure mercury lamp for a period of 2⅔ hours. The lamp was suspended about 2 inches above the top of the reactor. During this time, the temperature of the suspension of fine particles slowly increased to about 45° C. Subsequent to irradiation, the reactor was heated to 70° C. for a period of 4½ hours. There resulted very smooth spherical particles as determined by optical microscopy with an average particle size of about 1.3 microns as measured with a Bl-90 Brookhaven Instrument without any indications of suspension failure. The size of the particles was also confirmed by optical microscopy. The particles were washed and dried as described in Example I.

EXAMPLE VII

Fine toner polymer resin particles were prepared as follows: a photoinitiator-sensitizer system composed of benzophenone (0.164 gram, Fisher) and 4,4' bisdimethylaminobenzophenone (Michler's ketone) (0.245 gram, Polysciences) and a free radical polymerization initiator (1 gram of Lauroyl peroxide, Aldrich) were dissolved in a monomer mixture containing 1,1,1 trimethylolpropanetriacrylate (25.63 grams, Polysciences), dipentaerythritol monohydroxy pentaacrylate (4.4 grams, Polysciences) and styrene (60 grams, Aldrich). The resulting mixture was dispersed in 400 grams of a 0.05 percent poly(acrylic acid) (PAA) (Aldrich, weight average molecular weight 250,000) solution containing Alkanol XC (DuPont), a sodium alkylnaphthalene sulfonate, in a ratio 1 to 10 with respect to the amount of PAA, that is 0.005 percent, using a Brinkmann PT45/80 homogenizer and a PTA 35/4G probe for 2 minutes at setting 6 in a 1,000 milliliter beaker (cooled with ice). The solution was transferred to a 2 liter glass reactor and kept under constant agitation with a magnetic stirring bar. Thereafter, the solution resulting was irradiated under nitrogen with a 550 W Hanovia medium pressure mercury lamp for a period of 2⅔ hours. The lamp was suspended about 2 inches above the top of the reactor. During this time, the temperature of the suspension of fine particle slowly increased to about 45° C. Subsequent to irradiation, the reactor was heated to 70° C. for a period of 4 hours. There resulted very smooth spherical particles with an average particle size of about 2 microns as measured with a Bl-90 Brookhaven Instrument without any indications of suspension failure, that is no large particle aggregates were present as determined by optical microscopy. Also, particles as large as 4 to 5 microns average diameter were detected by optical microscopy. The particles were washed and dried as described in Example I.

EXAMPLE VIII

Fine polymer particles were prepared as follows: a photoinitiator-sensitizer system composed of benzophenone (0.164 gram, Fisher) and 4,4' bisdimethylaminobenzophenone (Michler's ketone) (0.24 gram, Polysciences) and a free radical polymerization initiator (1 gram of Lauroyl peroxide, Aldrich) were dissolved in a monomer mixture containing dipentaerythritol monohydroxy pentaacrylate (10 grams, Polysciences) and styrene (80 grams, Aldrich). The resulting mixture was dispersed in 400 grams of a 0.05 percent poly(acrylic acid) (PAA) (Aldrich, weight average molecular weight 250,000) solution containing Alkanol XC (DuPont), a sodium alkylnaphthalene sulfonate, in a ratio 1 to 10 with respect to the amount of PAA, that is 0.005 percent, using a Brinkmann PT45/80 homogenizer and a PTA 35/4G probe for 2 minutes at setting 4 in a 1,000 milliliter beaker (cooled with ice). The solution was transferred to a 2 liter glass reactor and kept under constant agitation with a magnetic stirring bar. Thereafter, the solution was irradiated under nitrogen with a 550 W Hanovia medium pressure mercury lamp for a period of 2⅔ hours. The lamp was suspended about 2 inches above the top of the reactor. During this time, the temperature of the suspension of fine particles slowly climbed to about 45° C. Subsequent to irradiation, the reactor was heated to 70° C. for a period of 4 hours. There resulted very smooth spherical particles with an average particle size of about 2.5 microns as measured with a Bl-90 Brookhaven Instrument without any indications of suspension failure. Particles ranging in average diameter of size from 2 to 15 microns were detected by optical microscopy. The particles may be washed and dried as described in Example I.

EXAMPLE IX

Toner polymer particles were prepared as follows: a photoinitiator-sensitizer system composed of benzophenone (0.20 gram, Fisher) and 4,4' bisdimethylaminobenzophenone (Michler's ketone) (0.24 gram, Polysciences) and a free radical polymerization initiator (1 gram of Lauroyl peroxide, Aldrich) were dissolved in a monomer mixture containing methyl methacrylate (10 grams, Polysciences) and styrene (80 grams, Aldrich). The resulting mixture was dispersed in 400 grams of a 0.05 percent poly(acrylic acid) (PAA) (Aldrich, molecular weight 250,000) solution containing Alkanol XC (DuPont), a sodium alkylnaphthalene sulfonate, in a ratio 1 to 10 with respect to the amount of PAA, that is 0.005 percent, using a Brinkmann PT45/80 homogenizer and a PTA 35/4G probe for 2 minutes at setting 4 in a 1,000 milliliter beaker (cooled with ice). The solution was transferred to a 2 liter glass reactor and kept under constant agitation with a magnetic stirring bar. Thereafter, the aforementioned mixture was irradiated under nitrogen with a 550W Hanovia medium pressure mercury lamp for a period of 2⅔ hours. The lamp was suspended about 2 inches above the top of the reactor. During this time, the temperature of the suspension of fine particles slowly climbed to about 45° C. Subsequent to irradiation, the reactor was heated to 70° C. for a period of 4 hours. There resulted very smooth spherical particles with an average particle size diameter of about 2.0 to about 10.0 microns as estimated by optical microscopy. There was no indication of suspension failure. The particles were washed and dried as described in Example I.

EXAMPLE X

Toner polymer particles were prepared as follows: a photoinitiator-sensitizer system composed of benzophenone (0.328 gram, Fisher) and 4,4' bisdimethylaminobenzophenone (Michler's ketone) (0.48 gram, Polysciences) and a free radical polymerization initiator (2.1 grams of Lauroyl peroxide, Aldrich) were dissolved in a monomer mixture containing dipentaerythritol monohydroxy pentaacrylate (20.13 grams, Polysciences) and styrene (160.2 grams, Aldrich). The resulting mixture was dispersed in 800 grams of a 0.1 percent poly(acrylic acid) (PAA) (Aldrich, molecular weight 250,000) solution containing Alkanol XC (Du- Pont), a sodium alkylnaphthalene sulfonate, in a ratio 1 to 10 with respect to the amount of PAA, that is 0.01 percent, using a Microfluidizer M-110 equipped with static polyethylene seals (Microfluidics Corporation) at a dynamic pressure of 45 psi and a flow of 333.3 milliliters per minute. After three continuous passes through the microfluidizer interacting chamber, the solution was collected and transferred to a 2 liter glass reactor and kept under constant agitation with a magnetic stirring bar. Subsequently, the solution was irradiated under nitrogen with a 550 W Hanovia medium pressure mercury lamp for a period of 2¼ hours. The lamp was suspended about 2 inches above the top of the reactor. During this time, the temperature of the suspension of fine particles slowly climbed to about 53° C. Subsequent to irradiation, the reactor was heated to 70° C. for a period of 4 hours. There resulted very smooth spherical particles with an average particle size diameter of about 0.3 micron as measured with a Brookhaven Bl-90 particle sizer. There was no indication of suspension failure. The particles were washed and dried as described in Example I.

EXAMPLE XI

Toner polymer particles were prepared as follows: a photoinitiator-sensitizer system composed of benzophenone (0.44 gram, Fisher) and 4,4' bisdimethylaminobenzophenone (Michler's ketone) (0.25 gram, Polysciences) and a free radical polymerization initiator (2.0 grams of Lauroyl peroxide, Aldrich) were dissolved in a monomer mixture containing methyl methacrylate (20.0 grams, Polysciences) and styrene (160.0 grams, Aldrich). The resulting mixture was dispersed in 800 grams of a 0.5 percent poly(acrylic acid) (PAA) (Aldrich, molecular weight 250,000) solution containing Alkanol XC (DuPont), a sodium alkylnaphthalene sulfonate, in a ratio 1 to 10 with respect to the amount of PAA, that is 0.05 percent, using a Microfluidizer M-110 equipped with static polyethylene seals (Microfluidics Corporation) at a dynamic pressure of 45 psi and a flow of 333.3 milliliters per minute. After three continuous passes through the microfluidizer interacting chamber, the solution was collected and transferred to a 2 liter glass reactor and kept under constant agitation with a magnetic stirring bar. Subsequently, the resulting solution was irradiated under nitrogen with a 550 W Hanovia medium pressure mercury lamp for a period of 2¼ hours. The lamp was suspended about 2 inches above the top of the reactor. During this time, the temperature of the suspension of fine particles slowly climbed to about 53° C. Subsequent to irradiation, the reactor was heated to 90° C. for a period of 2¼ hours, followed by 3 hours of heating at the boiling point of water. There resulted very smooth spherical particles with an average particle size diameter of from about 0.2 micron to about 0.3 micron as measured by optical microscopy. There was no indication of suspension failure. The particles were washed and dried as described in Example I.

EXAMPLE XII
Control

An attempt was made to prepare fine toner polymer particles as follows: a photoinitiator-sensitizer system composed of benzophenone (0.164 gram, Fisher) and 4,4' bisdimethylaminobenzophenone (Michler's ketone) (0.24 gram, Polysciences), and a free radical polymerization initiator (1 gram of Lauroyl peroxide, Aldrich) were dissolved in a monomer mixture containing dipentaerythritol monohydroxy pentaacrylate (10 grams, Polysciences) and styrene (80 grams, Aldrich). The resulting mixture was dispersed in 400 grams of a 0.05 percent poly(acrylic acid) (PAA) (Aldrich, weight average molecular weight 250,000) solution containing Alkanol XC (DuPont), a sodium alkylnaphthalene sulfonate, in a ratio of 1 to 10 with respect to the amount of PAA, that is 0.005 percent, using a Brinkmann PT45/80 homogenizer and a PTA 35/4G probe for 2 minutes at setting 4 in a 1,000 milliliter beaker (cooled with ice). The solution was transferred to a 2 liter glass reactor and retained under constant agitation with a magnetic stirring bar. The reactor was heated to 70° C. for a period of 4 hours. Heating the particles without prior treatment with UV light resulted in suspension failure, that is no discrete particles were found upon observation with an optical microscope. Also, aggregates of particles were found on the walls of the reactor after heating.

Other embodiments and modifications of the present invention may occur to those skilled in the art subsequent to a review of the present application. These embodiments and modifications thereof, as well as equivalents thereof, are also included within the scope of this invention.

What is claimed is:

1. A process for the preparation of polymer particles with an average diameter of from about 0.1 micron to about 40 microns, consisting essentially of (1) mixing at least one monomer with a free radical polymerization initiator, and an initiator capable of being activated with light, which monomer is dispersed in an aqueous phase containing a surfactant; (2) subjecting the aforementioned mixture of (1) to light irradiation for an effective period of time to accomplish stabilization of the mixture, while initiating photopolymerization of the monomer; and (3) subsequently heating the aqueous phase thereby completing polymerization of the monomer wherein the aforementioned dispersion is accomplished with a homogenizer or fluidizer.

2. A process in accordance with claim 1 wherein ultraviolet light or visible light is selected.

3. A process in accordance with claim 1 wherein heating to complete polymerization is accomplished at a temperature of from about 45° to about 100° C.

4. A process in accordance with claim 1 wherein there is mixed with the core monomer an inert filler resin.

5. A process in accordance with claim 1 wherein a mixture of monomers is selected.

6. A process in accordance with claim 5 wherein the mixture contains from 2 monomers to about 20 monomers.

7. A process in accordance with claim 6 wherein the inert filler resin which is present in an amount of from about 1 to 10 percent is comprised of a homopolymer or copolymer obtained from vinyl monomers.

8. A process in accordance with claim 1 wherein the polymerized product obtained is subjected to washing and drying.

9. A process in accordance with claim 1 wherein the polymeric product particles are substantially free of aggregation.

10. A process in accordance with claim 1 wherein heating and irradiation polymerization is accomplished at a temperature of from about 25° C. to about 60° C.

11. A process in accordance with claim 1 wherein the homogenizer is a high shear mixer.

12. A process in accordance with claim 1 wherein the fluidizer is a micro-fluidizer a microfluidizer.

13. A process in accordance with claim 1 wherein the monomer is selected from the group consisting of styrene and its derivatives, monocarboxylic acids and the derivatives thereof; dicarboxylic acids and the derivatives thereof; vinyl ketones; vinyl naphthalene; unsaturated mono-olefins; vinylidene halides; N-vinyl compounds; and mixtures thereof.

14. A process in accordance with claim 1 wherein the monomer is selected from the group consisting of α-methyl-styrene, p-chlorostyrene, acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; maleic acid, monobutyl maleate, dibutyl maleate; vinyl chloride, vinyl acetate and vinyl benzoate; vinylidene chloride; 1,4 butanediol diacrylate; trimethylolpropane triacrylate; unsaturated pentaerythritol vinyl derivatives with one or more double bonds; triethyleneglycol diacrylate; triethyleneglycol dimethacrylate; and N-vinyl pyrrole.

15. A process in accordance with claim 1 wherein the monomer is a vinyl monomer selected from the group consisting of an acrylate, a methacrylate, a polyester/styrene copolymer and unsaturated diallyl phthalate polymers.

16. A process in accordance with claim 1 wherein there is selected a monomer or copolymer selected from the group consisting of poly(methyl methacrylate), poly(methyl methacrylate-hydroxy-ethyl acrylate), poly(methyl methacrylate-acrylated glycidyl methacrylate), and poly(methyl methacrylate-methacrylic acid).

17. A process in accordance with claim 1 wherein the polymerization initiator is selected from the group consisting of organic soluble azo compounds and peroxides.

18. A process in accordance with claim 17 wherein the free radical polymerization initiator is benzoyl peroxide, lauroyl peroxide, 1-1-(t-butylperoxy)-3,3,5-trimethylcyclohexane, n-butyl-4,4-di-(t-butylperoxy)valerate, dicumyl peroxide, 2,2'azodimethylvaleronitrile, 2,2'azoisobutyronitrile, azobiscyclohexanenitrile, and 2-methylbutyronitrile.

19. A process in accordance with claim 1 wherein the initiator is comprised of compounds comprised of an ionic dye and its counterion.

20. A process in accordance with claim 19 wherein cationic dyes selected from the group consisting of methylene blue, safranine O, malachite green, cyanine dyes and rhodamine dyes, and mixtures thereof are utilized.

21. A process in accordance with claim 19 wherein the counterion for the ionic dye is tetraphenylbutylborate, trianzylbutylborate, or mixtures thereof.

22. A process in accordance with claim 1 wherein there are selected as initiators propiophenones.

23. A process in accordance with claim 1 wherein the initiators are selected from the group consisting of mixtures of benzophenone derivatives and organic tertiary aliphatic amines, esters of p-dimethylaminobezoic acids, 4,4'-bisdialylamino benzophenones, polymeric ethers of primary or secondary alcohols, glycols, primary or secondary aliphatic alcohols, and mixtures thereof.

24. A process in accordance with claim 1 wherein the initiator is comprised of a mixture of benzophenone and an aromatic (Michler's) ketone.

25. A process in accordance with claim 1 wherein the stabilization of the mixture is accomplished with a medium pressure mercury lamp with a maximum output at 365 nanometers.

26. A process in accordance with claim 1 wherein the reaction mixture contains a photosensitizer.

27. A process for the preparation of polymer particles consisting essentially of (1) mixing at least one monomer with a free radical polymerization initiator, and an initiator capable of being activated with light, which monomer mixture is dispersed in an aqueous phase containing a surfactant; (2) subjecting the aforementioned mixture of (1) to light irradiation for an effective period of time to accomplish stabilization of the mixture, while initiating photopolymerization of the monomer; and (3) subsequently heating the aqueous phase thereby completing polymerization of the monomer.

28. A process for the preparation of polymer particles with an average diameter from about 0.1 to about 40 microns, consisting essentially of (1) dispersing a monomer, a free radical initiator, an ultraviolet light sensitizer and/or photoinitiator in an aqueous phase containing a surfactant, which dispersion is formed by a homogenizer; irradiating the resulting suspension for an effective period of time to accomplish stabilization of the mixture while initiating photopolymerization of the monomer mixture, subsequently heating the aqueous phase thereby completing polymerization of the monomer and thereafter washing the resulting polymer particles.

29. A process in accordance with claim 28 wherein ultraviolet light or visible light is selected.

30. A process in accordance with claim 28 wherein heating to complete polymerization is accomplished at a temperature of from about 45° to about 100° C.

31. A process in accordance with claim 28 wherein heating and irradiation polymerization is accomplished at a temperature of from about 25° to about 60° C., and wherein dispersion is accomplished with a high shear mixture.

32. A process in accordance with claim 28 wherein irradiating is accomplished for a period of time of from about 1 minute to about 7 hours.

33. A process in accordance with claim 28 wherein irradiating is accomplished for a period of time of from about 30 minutes to about 6 hours.

* * * * *